May 4, 1965 R. L. VAN WINKLE ETAL 3,182,332

RECORDER CONSTRUCTION

Filed Dec. 26, 1962 5 Sheets-Sheet 1

INVENTORS
ROY L. VAN WINKLE
WILLIAM L. LANKFORD JR.
CARL S. WARD
BY William S. Dorman
ATTORNEY INVENTORS
ROY L. VAN WINKLE
WILLIAM L. LANKFORD JR.
CARL S. WARD
BY William S. Dorman
ATTORNEY May 4, 1965 R. L. VAN WINKLE ETAL 3,182,332

RECORDER CONSTRUCTION

Filed Dec. 26, 1962 5 Sheets-Sheet 3

INVENTORS
ROY L. VAN WINKLE
WILLIAM L. LANKFORD JR.
CARL S. WARD
BY William S Dorman
ATTORNEY INVENTORS
ROY L. VAN WINKLE
WILLIAM L. LANKFORD JR.
CARL S. WARD
BY William S. Dorman
ATTORNEY INVENTORS
ROY L. VAN WINKLE
WILLIAM L. LANKFORD JR.
CARL S. WARD
BY William S. Dorman
ATTORNEY 3,182,332

RECORDER CONSTRUCTION

Roy L. Van Winkle, Edmond, and William L. Lankford, Jr., and Carl S. Ward, Oklahoma City, Okla., assignors to The Geolograph Company, Oklahoma City, Okla., a corporation of Oklahoma Filed Dec. 26, 1962, Ser. No. 247,140
12 Claims. (Cl. 346—44)

The present invention relates to a recorder and, more particularly to a recorder construction assembled from one or more modules, all of which are substantially identical in structure and each of which includes, preferably, a pair of recording pens. By virtue of the modular construction, it is possible to assemble a recorder of variable size with a corresponding variable number of pens consistent with the recording requirements of a given situation.

Purely by way of illustration and not by way of limitation, the recorder construction will be described in connection with the recording of various information relative to the drilling of oil wells. The operator of a drilling rig generally wishes to know the rate of penetration of the drill bit into the ground as well as the weight on the drill stem. There are a number of other variables which may also be of considerable interest to the operator: among these are the rotary speed of the drilling table, the torque on the drill string, the output pressure from the mud pump, the number of strokes per minute of the mud pump, the level of the mud in the discharge pit, the level of mud in the suction pit, and the output pressure from the air compressor. There may be other variables that might be of peculiar interest to certain operators, but the above indicated items are believed to be the most significant. Naturally, some operators will feel that certain of these variables are of great importance, whereas other operators will feel that the same variables are of lesser significance. Some operators desire a minimum of recorded information and other operators will call for as much recorded information as can be obtained.

The prior art does not provide a recorder which can meet the above indicated various and differing demands of operators. However, as will hereinafter appear, the present invention, by reason of its modular construction, can provide a recorder which can satisfy the demands of any operator within reasonable limits.

The present invention includes two similar and complementary end units between which one, two or more recorder modules may be mounted in assembled relation. Each module preferably has mounted therein two pen arms with associated recording pens. For each module, there will be provided a drum segment which will be supported between the two end units and in position to be engaged by the recording pens. One of the end units has a freely rotatable disc which is adapted to engage and support one end of a drum segment or assembly. The other end unit has a similar disc which is adapted to engage the opposite end of the drum segment or assembly; however, the last mentioned end unit has means for driving the disc so as to rotate the drum or drum assembly. Means are provided on abutting faces to permit attachment of the modules one to another and to the end units. A cover of corresponding segmental construction may also be provided as desired. Thus, if a four pen unit is required, two modules are assembled between the two end units with two corresponding drum segments being supported between the end discs referred to above. Similarly, if a six pen unit is desired, then three modules are assembled between the end units with three drum segments being employed in combination, and so on.

Therefore, it is a principal object of the present invention to provide a recorder of modular construction as described above and as set forth in greater detail herein.

Other and further objects and adavntageous features of the present invention will hereinafter more fully appear in connection with a detailed description of the drawings wherein.

Figure 1:
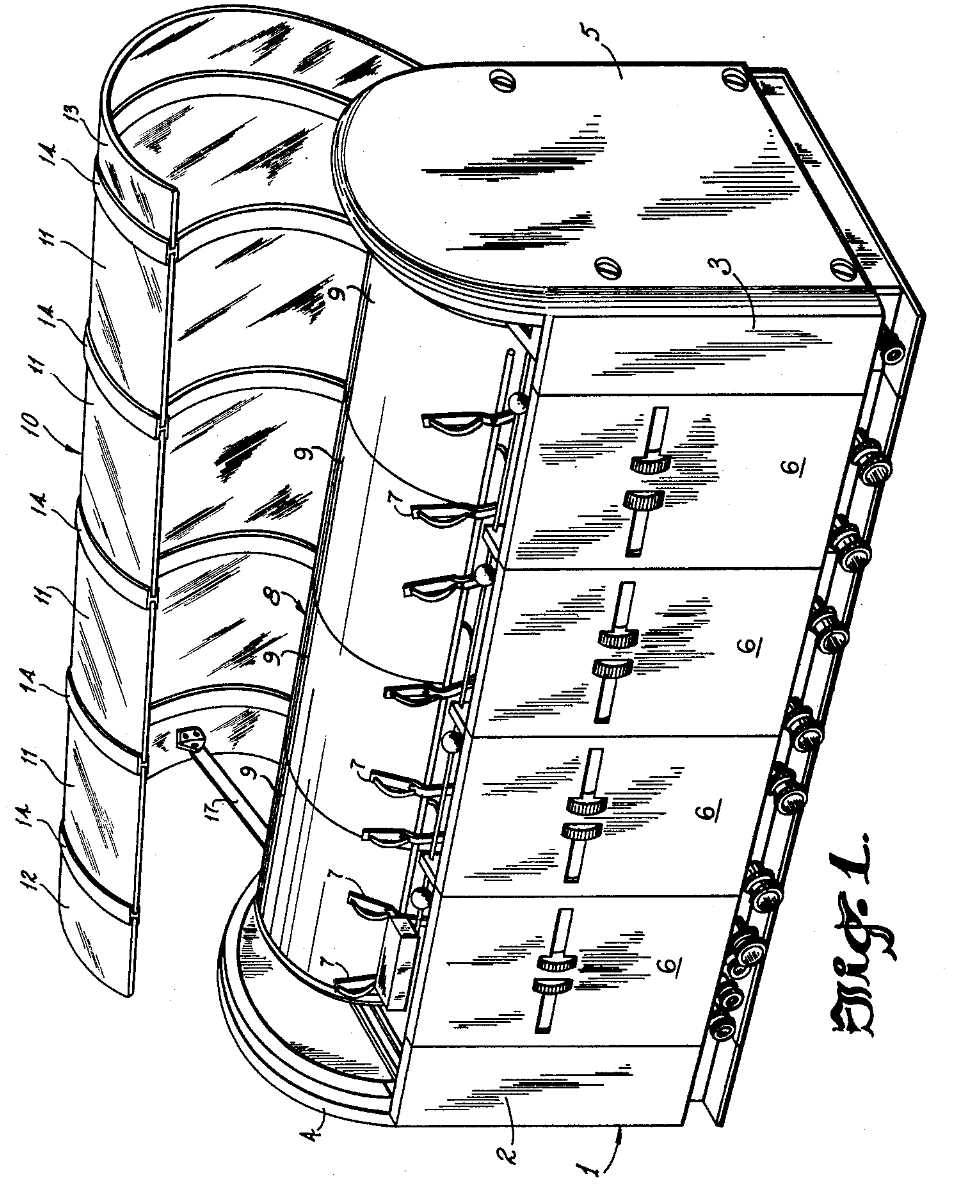
FIGURE 1 is a perspective view of a recorder construction illustrating a plurality of modules arranged in assembled relation to form a multi-pen recorder.

Referring to the drawings in detail, FIGURE 1 shows an overall recorder construction generally designated by the reference numeral 1. The recorder assembly includes a left-hand end unit 2 and a right-hand end unit 3, later to be disclosed in greater detail, to which are attached end cover plates 4 and 5, respectively. A plurality of modules 6 are mounted between the end units 2 and 3, being connected to one another in assembled relation and to the end units as will hereinatfer more fully appear. Each of the modules 6 includes two pens, all designated by the reference character 7. Since four such modules are shown in FIGURE 1, eight pens 7 are employed in the specific recorder construction illustrated herein. However, it must be emphasized that any number of modules 6 may be employed in any given recorder construction, such that the number of pens will vary accordingly.

The mechanical details of the modules 6 are substantially identical as will hereinafter appear and, preferably, the means within each module 6 for actuating the pens 7 therein will be the same from module to module. On the other hand, there may be specific circumstances wherein the internal components of one or more modules might be somewhat different from the internal components of the remaining modules; for example, it is contemplated that the left-hand module 6 shown in FIGURE 1 should be designed so that its left-hand pen 7 records drilling penetration and its right-hand pen 7 will record weight. In the latter circumstances, this left-hand module 6 can include the internal components such as those described in co-pending application Serial No. 223,358 filed on September 13, 1962, and entitled "Pneumatic Penetration Recorder" for actuating the left-hand pen 7. Suitable means (not shown), and forming no part of the present invention, will also be included in the left-hand module 6 for actuating the right-hand pen 7 therein to accurately record the weight on the drill string. On the other hand, it must be emphasized that all of the modules 6 can be identical in all respects, the above explanation concerning penetration and weight recording being offered purely for purposes of illustration and to show the overall versatility of the invention.

Figure 5:
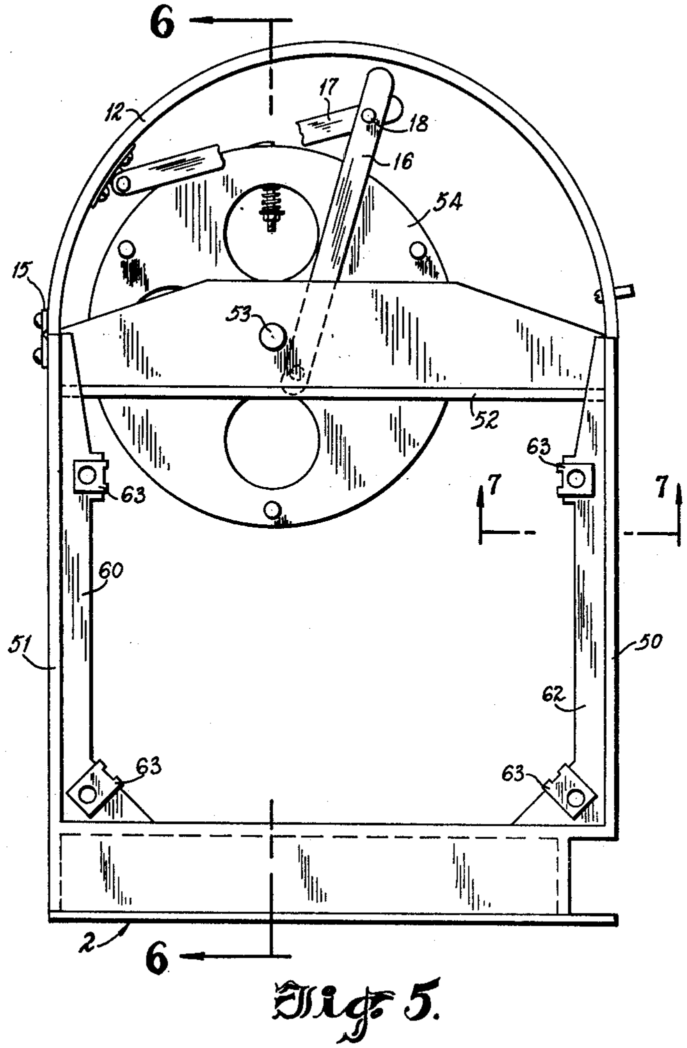
FIGURE 5 is a left side elevation of the left-hand end component of the recorder construction shown in FIGURE 1.

The recorder shown in FIGURE 1 includes an elongated drum generally designated by the reference character 8 and formed by four intermating drum segments 9, the details of which will be described hereinafter in connection with FIGURES 12 and 13. Thus, one drum segment 9 will be associated with each module 6. A suitable chart (not shown) will be mounted on the drum 8 and, in this instance, this chart will be provided with eight annular recording portions corresponding to the eight pens 7. A suitable cover generally designated by the reference character 10 is formed from a plurality of intermediate segments 11 of transparent plastic material and end segments 12 and 13 of the same material. These segments are held together in assembled relation by means of rubber or plastic strips 14 whose cross section is generally H-shaped. Each segment 11, 12, or 13 is connected by means of a suitable hinge to its complementary module or end unit, for example, as indicated by the hinges 15 shown in FIGURES 2 and 5. FIGURE 5 also shows a support for the lid comprising arms 16 and 17 pivotally connected to one another at 18 and at their other ends to the lid segment 12 and the end unit 2.

Figure 2:
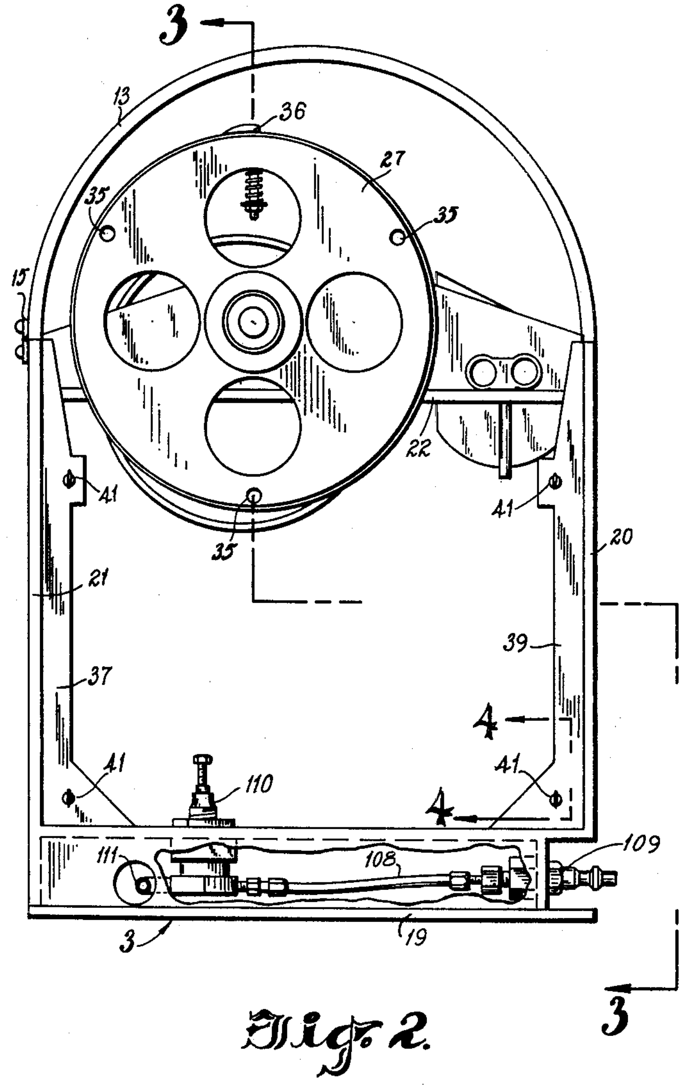
FIGURE 2 is a left side elevation of the right-hand end component of the recorder construction shown in FIGURE 1.
Figure 3:
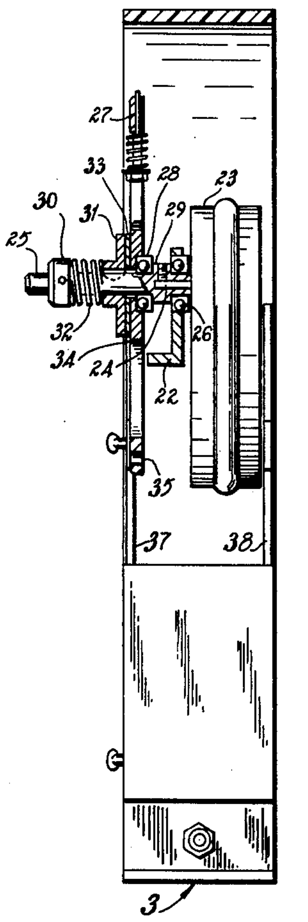
FIGURE 3 is a sectional view taken along section line 3—3 of FIGURE 2 including certain details of the drive system for the composite drum.

Referring to FIGURES 2 and 3, the right-hand end assembly 3 is defined by a flat base plate 19 and front and rear flat upright members 20 and 21, respectively. An L-shaped cross bracket 22 extends between the two uprights 20 and 21 adjacent the upper ends thereof. A clock 23 is suitably mounted within the frame 3. The internal details of the clock are considered conventional and, hence, are not shown; however, the clock does have an outwardly extending shaft 24 which is keyed to a stub shaft 25. The right-hand end of the stub shaft 25, as it appears in FIGURE 3, is rotatably mounted in a suitable bearing 26 which is received within a suitable hole in the cross bracket 22. A disc 27 is freely rotatably mounted on the stub shaft 25 engaging, at its right-hand end as it appears in FIGURE 3, a bearing member 28 which is urged against a shoulder 29 of the stub shaft 25. A collar 30 is keyed to the left-hand end of the stub shaft 25. A circular clutch plate 31 is also keyed to the stub shaft 25, but is longitudinally slidable with respect thereto. A coil spring 32 is mounted between the collar 30 and the clutch plate 31 so as to urge the latter resiliently towards the right. A friction plate 33 is mounted between the clutch plate 31 and the hub portion 34 of the disc 27.

Under normal operating conditions, when the clock shaft 24 rotates, the stub shaft 25 will rotate therewith imparting rotary movement to the disc 27 and the friction disc 33. If, however, it is desired to index the drum, this effect can be accomplished by imparting positive rotary motion to the disc 27 by hand to overcome the frictional forces of engagement between the clutch 31, friction plate 33 and the hub portion 34.

The disc 27 also includes three holes 35 equally spaced around the circumference of the disc and adjacent the periphery thereof. As will hereinafter more fully appear, these holes will receive corresponding pins on the adjacent drum segment which will later engage the disc in mating relationship. Disc 27 also includes a chart hook 36 which, when turned ninety degrees from the position shown in FIGURES 2 and 3, can be employed to hold the edge of a chart (not shown) against the adjacent drum segment (not shown). The frame 3 also includes web portions 37 and 38 on the upright 21 adjacent the side edges thereof. The upright 20 also includes corresponding webs, only one of which is shown at 39 in FIGURE 2.

Figure 4:
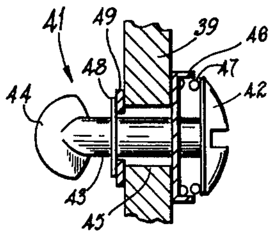
FIGURE 4 is a sectional view, on an enlarged scale, taken along section line 4—4 of FIGURE 2 showing the details of a snap-on screw.

Suitable snap-on fasteners 41 are mounted in the webs 37 and 39 as shown in FIGURE 2. In essence, these fasteners are the same as the quarter-turn fasteners used in the aircraft industry. As shown in FIGURE 4, the fastener 41 includes a head portion 42, a shank portion 43 and a tongue 44 at the opposite end of the shank 43 from the head. The shank 43 passes through a suitable hole 45 in the web 39. A spring retainer 46 and a spring 47 are mounted on the shank 43 adjacent the head 42 so as to urge the fastener towards the right. Washers 48 and 49 serve to limit movement of the fastener 41 towards the right.

Figure 6:
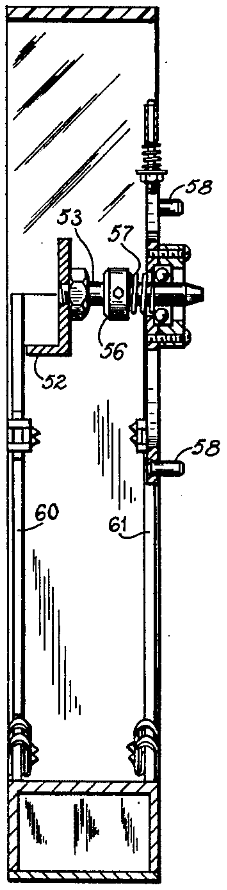
FIGURE 6 is a sectional view taken along section line 6—6 of FIGURE 5.

As shown in FIGURE 5, the end unit 2 includes a frame structure which is substantially identical to the frame structure shown in FIGURES 2 and 3. That is, frame 2 includes uprights 50 and 51 and L-shaped cross bracket 52. A stub shaft 53 is secured, at its left-hand end as shown in FIGURE 6, to the cross bracket 52 and at its right-hand end supports a bearing 55 on which a disc 54 is rotatably mounted. A collar 56 is keyed to the shaft 53 and a spring 57 mounted between the collar and the bearing 55 assists in holding the disc 54 in mating relation with the adjacent drum segment as will hereinafter more fully appear. The right-hand face of the disc 54 has mounted therein three pins 58, only two of which are shown in FIGURE 6. These pins are similarly arranged as the holes 35 in the disc 27 and are adapted to fit into corresponding holes in an adjacent drum segment as will hereinafter more fully appear.

Upright 51 is provided with two webs 60 and 61 which are substantially identical to webs 37 and 38 previously described. Upright 50 is provided with two webs only one of which is shown as at 62 in opposing relation to the webs 60 and 61. Webs 60 and 62 have mounted thereon clips 63, the details of which will be described in connection with FIGURES 7 and 8. The last mentioned clips permit attachment of cover member 4 in which is mounted four suitable fastening members (not shown) substantially the same as those shown in FIGURE 4 and located in positions opposite from the clips. The web 61 on the upright 51 and the other web (not shown) on the right-hand side of upright 50 are similarly provided with clips 63 spaced in the same relative positions as shown in FIGURE 5; these clips at the right-hand side of the unit 2 permit connection, through the use of fasteners such as shown in FIGURE 4, with an adjacent module 6.

Figure 7:
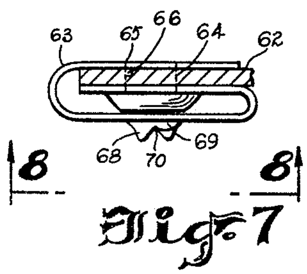
FIGURE 7 is a sectional view, on an enlarged scale, taken along section line 7—7 of FIGURE 5 showing the details of the complementary clip which is engaged by the snap-on screw of FIGURE 4.
Figure 8:
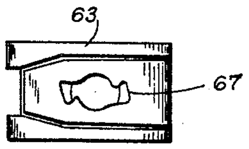
FIGURE 8 is an elevation of the clip per se as it would appear taken along viewing line 8—8 of FIGURE 7, or in other words, showing the opposite side of the clip from that shown in FIGURE 5.

Referring now to FIGURES 7 and 8, these show the details of the clip 63 which is more or less conventional in character and which can be used in conjunction with the fastener 41 of FIGURE 4 to provide connection between the modules, the end units and the cover plates. Whereas the clip 63 is described hereinafter in detail, it should be understood that any other conventional clip which is adapted to perform the same function would be suitable for the purposes of the present invention. The clip 63 is a piece of resilient sheet metal bent in the form shown in FIGURE 7. The web 62 will be provided with a hole 64 through which the tongue 44 and shank 43 will pass to engage the clip as will hereinafter appear. The clip itself is provided with a hole 65 which is complementary to and in alignment with the hole 64. A small retaining lip 66 on the clip 63 will engage in the hole 64 and prevent the clip from sliding off from the web 62. On the opposite side of the clip 63 from the hole 65 is a slot 67 shaped as shown in FIGURE 8. When the tongue 44 of the fastener 41 is in alignment with the slot 67, this tongue can pass through; thereafter, a ninety degree rotation of the fastener 41 will place the latter in locking engagement with the clip 63. The projections 68 and 69 on the opposite side of the clip 63 from the hole 65 form between them recesses 70 in which the sides of the tongue are received to hold the fastener in the locked position as indicated above.

Figures 9, 10:
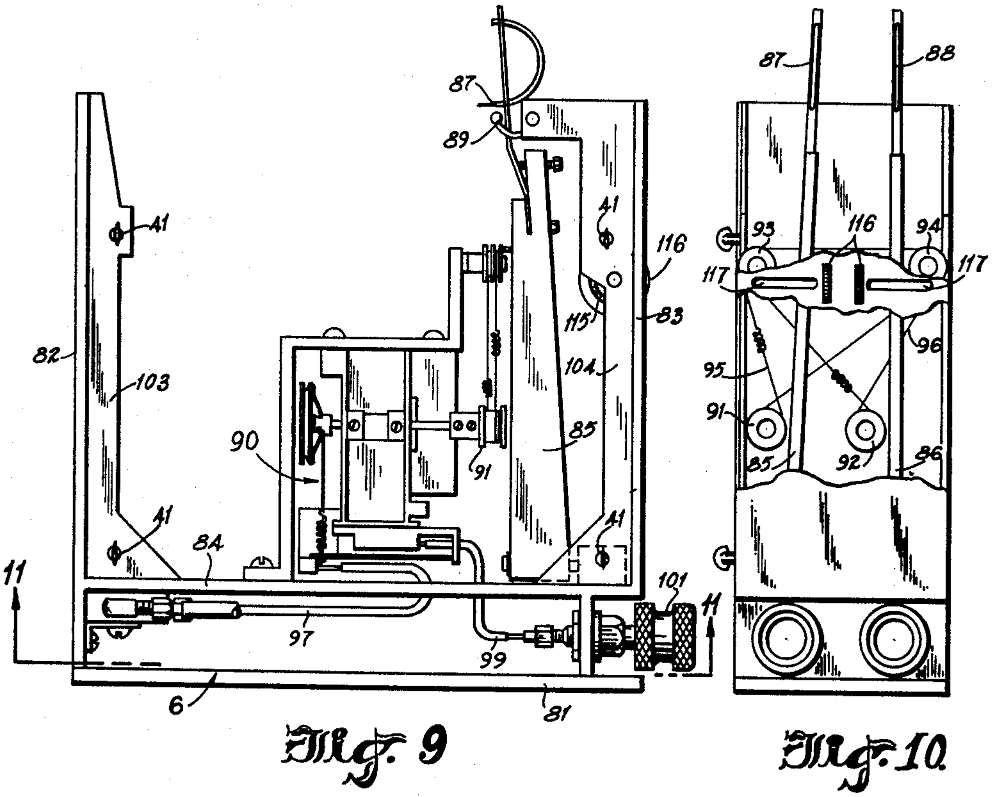
FIGURE 9 is a left side elevation of one of the intermediate components, or modules, of the present invention.
FIGURE 10 is a front elevation, with certain parts broken away, of the module shown in FIGURE 9.
Figure 11:
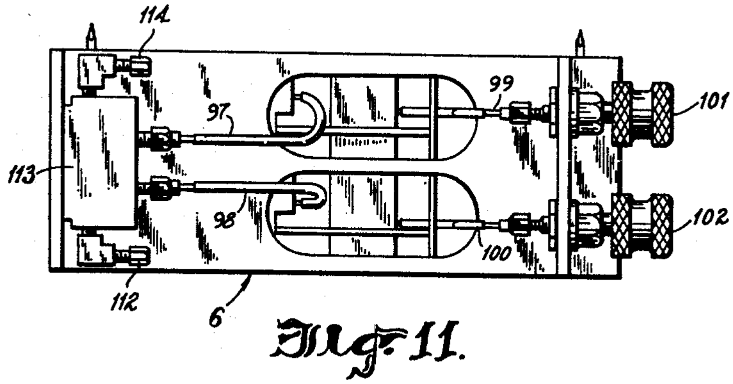
FIGURE 11 is a sectional view taken along section line 11—11 of FIGURE 9 of the module shown therein.

The mechanical details of each module 6 are shown in FIGURES 9, 10 and 11. Each module includes a base member 81, a rear upright 82 and a front upright 83. A horizontal partition 84 forms a part of the frame structure above the base 81. A pair of pen arms 85 and 86 are suitably pivotally mounted adjacent their lower ends on the partition 84. Pens 87 and 88 are mounted at the upper ends of the arms 85 and 86, respectively, and are adapted to engage a suitable chart (not shown) mounted on the composite drum 8, later to be described in detail. A pivotal pen holding means generally designated by the reference character 89 is adapted to be moved in such a manner as to hold the pens 87 and 88 in positions away from the chart or drum. Two servo mechanisms generally designated by the reference character 90 (only one of which is shown in FIGURE 9) are mounted within each module. Suitable pulleys such as pulleys 91, 92, 93 and 94 and cables 95 and 96 are adapted to transmit the rotary motion of the servos 90 into corresponding pivotal movement of the pen arms 85 and 86. A fixed pressure source is provided to each servo through the conduits 97 and 98. Variable pressure is supplied to the servo mechanisms 90 through the conduits 99 and 100. The quick-disconnect couplers 101 and 102 permit connection from the conduits 99 and 100 to sources of pressure representing the variables whose conditions are to be recorded.

The details of a servo mechanism 90 are not considered necessary to an understanding of the present invention. In fact, any device capable of transforming in a uniform manner, information introduced into module 6 into corresponding reproducible deflections of the pen arms 85 and 86 would be suitable for the purposes of this invention. Purely by way of illustration, it is contemplated that the pressure introduced through the conduits 99 and 100 will vary between three pounds and fifteen pounds per square inch. The lower limit will indicate the zero reference for the particular pen involved. This incoming pressure through the conduit 99, for example, will be compared with the fixed pressure coming in through the conduit 97 within the servo mechanism 90 so as to produce the corresponding proper deflection of the pen arm 85.

It is contemplated that a plurality of variables, such as the rotary speed of the drilling table, the torque on the drill string, the mud pump pressure, the mud pit levels, and the mud pump speed, as well as certain other variables, can be converted into a three to fifteen pound variable pneumatic pressure. Thus, with respect to the present application, any module can be connected with any such source interchangeably with any other module.

Returning to FIGURES 9, 10 and 11, upright 82 is provided with a web 103 in which are mounted fasteners 41. Similarly, upright 83 is provided with a web 104 which also includes two fasteners 41. Although not shown in FIGURE 9, uprights 82 and 83 are provided with similarly shaped webs which would be located at the right-hand end (relative to FIGURE 10) and which would include, in positions corresponding to the fasteners 41, clips 63 such as are described in detail in FIGURES 7 and 8.

Figure 13:
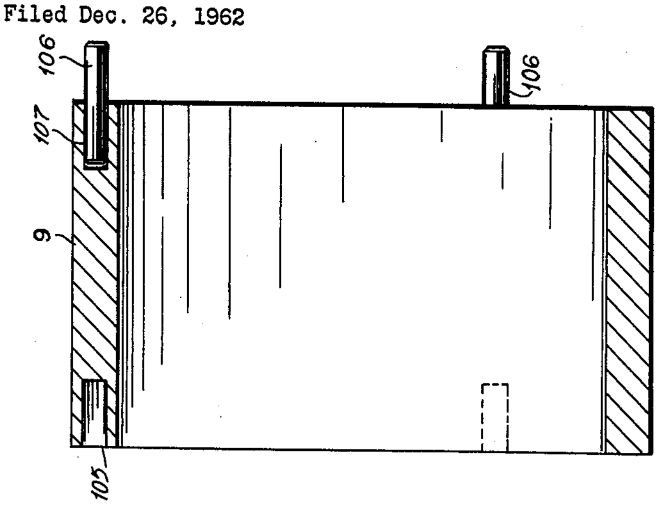
FIGURE 13 is a sectional view taken along section line 13—13 of FIGURE 12 showing additional details of the drum segment.
Figure 12:
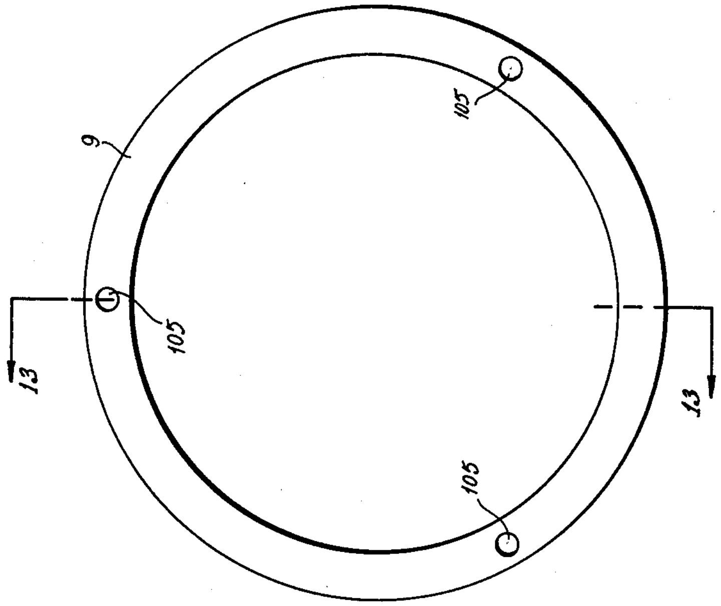
FIGURE 12 is a left end elevation of one of the drum segments of the composite drum shown in FIGURE 1.

FIGURES 12 and 13 show one of the drum segments 9, a plurality of which, when connected together as shown in FIGURE 1, form the composite drum 8. Each drum segment 9 is a hollow annular member having at one side edge thereof three spaced holes 105. In the opposite side of each drum segment 9 from the holes 105 are provided three outwardly projecting pins 106 which are received in friction-tight engagement within three spaced holes 107. Pins 106 are suitably spaced and are of suitable size to engage the corresponding holes 105 on another drum segment 9, or, in the alternative, to engage the holes 35 in the disc 27. Likewise, the holes 105 are also suitably spaced and sized to engage the pins 58 on the disc 54.

Assuming now it is desired to construct the recorder construction shown in FIGURE 1 from a plurality of modules 6 and the end units 2 and 3 and a plurality of drum segments 9, the following steps may be taken. The left-hand module 6 shown in FIGURE 1 is placed in abutting relation with the end unit 2. The fasteners 41 on the left-hand side of this module 6 are fitted into the corresponding clips 63 on the right-hand edge of the end unit 2; by turning these fasteners 41 through a one-quarter turn each, the left-hand module 6 is attached to the end unit 2. The next module 6, that is, the module which is second from the left, FIGURE 1, is placed in abutting relation with the first module 6 referred to above and the fasteners 41 at the left-hand edge of the second module are placed in engagement with the corresponding clips 63 on the right-hand edge of the first module. Turning of the fasteners 41 on the second module will cause engagement between the first and second modules. This same procedure is repeated until the four modules shown in FIGURE 1 are connected together. At this point, four drum segments are placed in intermating relation by inserting the pins 106 on one drum segment 9 into the corresponding holes 105 of an adjacent drum segment. The composite drum assembly thus formed is placed into the unit in such a manner that the holes 105 of the left-hand drum segment 9 shown in FIGURE 1 engage the pins 58 on the disc 54. The end unit 3 is now placed against the right-hand module 6 in such a manner that the fasteners 41 on the left-hand edge of the end unit 3 engage the corresponding clips 63 on the right-hand edge of the adjacent module 6, while the holes 35 in the disc 27 simultaneously engage the pins 106 at the right-hand end of the drum assembly 8. Turning of the fasteners 41 will lock the end unit 3 against the adjacent module 6 and will hold the composite drum 8 firmly in position between the discs 54 and 27. The spring 57 will be slightly compressed to insure that the drum 8 is held firmly together.

As far as the cover or lid 10 is concerned, the same can be assembled and attached at this juncture or the individual segments could have been assembled contemporaneously with the addition of each module. The cover plates 4 and 5, each of which have mounted therein four fasteners 41 (not shown), can then be placed in abutting relation with the outside edges of the end units 2 and 3 so as to engage complementary clips 63 (not shown) whereby upon turning the fasteners 41 through one-quarter turn each, the cover plates 4 and 5 can be locked in position.

In FIGURE 2 there is shown a conduit 108 leading externally to a quick-disconnect coupler 109 and internally to a pressure control valve 110. A conduit 111 leading from the control valve 110 provides a controlled source of pressure which can be used as the controlled reference pressure for all of the servos 90 employed in the recorder. Thus, by connecting from the conduit 111 to the fitting 112 shown in FIGURE 11, the controlled reference pressure will be supplied through a manifold 113 to the conduits 97 and 98. A fitting 114 is located on the opposite side of the module 6 shown in FIGURE 11 and is in communication with the manifold 113. Thus, a short conduit (not shown) connecting from the fitting 114 to the fitting 112 on the next adjacent module 6 will provide the fixed source of pressure for this next adjacent module. These short connections are continued as desired and the last fitting 114 is, of course, blocked.

As stated heretofore, the modules are interchangeable and as many or as few modules can be employed consistent with the recording requirements. In order that the operator will be aware at all times of the location of the pen which records a given variable, each module 6 is provided with a pair of cylinders, both of which are designated by the reference character 115. These cylinders 115 are mounted behind the front upright 83 and are suitably journalled within the frame for rotation. Knurled discs 116 keyed with the cylinders 115 project outwardly through suitable vertical slots in the upright 83 to permit rotation of the cylinders 115 from the outside of the recorder. Each cylinder 115 will have suitable indicia on the surface thereof as might be provided by a suitable strip of paper (not shown) which will indicate a plurality of different variables, such as "pump pressure," "torque," "rotary r.p.m.," etc. Longitudinal slots 117 in the upright 83 are so located with respect to the cylinders 115 that one given item of information will appear through each slot at any particular time. If the information supplied to a given pen of a module 6 is changed, then the corresponding knurled disc 116 can be rotated so that the corresponding cylinder 115 will properly reflect through the slot 117 the information which this given pen is intended to record.

Whereas, the present invention has been described in particular relation to the drawings attached hereto, it should be understood that other and further modifications, apart from those shown or suggested herein, may be made within the spirit and scope of this invention.

What is claimed is:

1. A recorder construction comprising a pair of end units arranged in spaced and parallel relation, one end unit having a first disc freely rotatably mounted therein, the other end unit having a second disc mounted for rotation therein coaxially with said first disc, means mounted in said other unit for rotating said second disc, a plurality of recorder modules mounted between said end units, a plurality of hollow cylindrical drum segments interconnected with each other and forming a composite drum assembly mounted between said end units, one end of said drum assembly being connected to said first disc and the other end of said drum assembly being connected to said second disc, each recorder module having pivotally mounted therein a pair of recorder arms upon which are supported a pair of recording elements, respectively, adapted to bear against the corresponding drum segment, means mounted in each module for each pen arm therein for deflecting each pen arm in accordance with the changing conditions of a measured variable, and means associated with each module and with each end unit for connecting all of said modules together in assembled relation and to the end units.

2. A recorder as set forth in claim 1 wherein biasing means is provided in said one end unit for urging said first disc resiliently in a direction towards said second disc to insure proper engagement of said drum assembly between said discs.

3. A recorder as set forth in claim 1 wherein said means for rotating said second disc is coupled thereto through a friction drive.

4. A recorder construction comprising a pair of end units arranged in spaced and parallel relation, one end unit having a first disc freely rotatably mounted therein, the other end unit having a shaft rotatably mounted therein, a second disc freely rotatably mounted on said shaft for rotation coaxially with said first disc, a clutch plate slidably mounted on said shaft and keyed for rotation therewith, said second disc having a hub portion disposed in spaced and parallel relation with said clutch plate, a friction disc interposed between said clutch plate and said hub portion, resilient means urging said clutch plate towards said hub portion so as to compress said friction disc between said clutch plate and said hub portion, means for rotating said shaft, a plurality of recorder modules mounted between said end units, a plurality of hollow cylindrical drum segments interconnected with each other and forming a composite drum assembly mounted between said end units, one end of said drum assembly being connected to said first disc and the other end of said drum assembly being connected to said second disc, each recorder module having pivotally mounted therein a pair of recorder arms upon which are supported a pair of recording elements, respectively, adapted to bear against the corresponding drum segment, means mounted in each module for each pen arm therein for deflecting each pen arm in accordance with the changing conditions of a measured variable, and means associated with each module and with each end unit for connecting all of said modules together in assembled relation and to the end units.

5. A recorder as set forth in claim 4 wherein biasing means is provided in said one end unit for urging said first disc resiliently in a direction towards said second disc to insure proper engagement of said drum assembly between said discs.

6. A recorder construction comprising a pair of end units arranged in spaced and parallel relation, one end unit having a first disc freely rotatably mounted therein, the other end unit having a second disc mounted for rotation therein coaxially with said first disc, means mounted in said other unit for rotating said second disc, a recorder frame mounted between said end units, fastening means mounted on each end unit and cooperating with corresponding means on an adjacent portion of said recorder frame for connecting the said units and said frame in assembled relation, a drum assembly mounted within said frame between said end units, one end of said drum assembly being provided with a connecting means for connecting said drum assembly to said first disc and the other end of said drum assembly being provided with a connecting means for connecting said drum assembly to said second disc, said recorder frame having mounted therein a recorder arm upon which is supported a recording element adapted to bear against said drum assembly, and means mounted in said recorder frame for deflecting said pen arm in accordance with the changing conditions of a measured variable.

7. A recorder construction comprising a pair of end units arranged in spaced and parallel relation, one end unit having a first disc freely rotatably mounted therein, the other end unit having a second disc mounted for rotation therein coaxially with said first disc, means mounted in said other unit for rotating said second disc, a plurality of recorder modules mounted between said end units, a plurality of hollow cylindrical drum segments interconnected with each other and forming a composite drum assembly mounted between said end units, one end of said drum assembly being connected to said first disc and the other end of said drum assembly being connected to said second disc, each recorder module having pivotally mounted therein a recorder arm upon which is supported a recording element adapted to bear against the corresponding drum segment, means mounted in each module for deflecting the associated pen arm in accordance with the changing conditions of a measured variable, and means associated with each module and with each end unit for connecting all of said modules together in assembled relation and to the end units.

8. A recorder construction comprising a pair of end units arranged in spaced and parallel relation, one end unit having a first disc freely rotatably mounted therein, the other end unit having a second disc mounted for rotation therein coaxially with said first disc, means mounted in said other unit for rotating said second disc, a plurality of recorder modules mounted between said end units, means associated with each module and with each end unit for connecting all of said modules together in assembled relation and to the end units for forming a composite frame assembly, a plurality of hollow cylindrical drum segments interconnected with each other and forming a composite drum assembly mounted between said end units, one end of said drum assembly being connected to said first disc and the other end of said drum assembly being connected to said second disc, a pen arm pivotally mounted within said frame assembly and having supported thereon a recording element adapted to bear against said drum assembly, and means mounted in said frame assembly for deflecting said pen arm in accordance with the changing conditions of a measured variable.

9. A recorder as set forth in claim 8 wherein biasing means is provided in said one end unit for urging said first disc resiliently in a direction towards said second disc to insure proper engagement of said drum assembly between said discs.

10. A recorder as set forth in claim 8 wherein said means for rotating said second disc is coupled thereto through a friction drive.

11. A recorder construction comprising a pair of end units arranged in spaced and parallel relation, one end unit having a first disc freely rotatably mounted therein, the other end unit having a shaft rotatably mounted therein, a second disc freely rotatably mounted on said shaft for rotation coaxially with said first disc, a clutch plate slidably mounted on said shaft and keyed for rotation therewith, said second disc having a hub portion disposed in spaced and parallel relation with said clutch plate, a friction disc interposed between said clutch plate and said hub portion, resilient means urging said clutch plate towards said hub portion so as to compress said friction disc between said clutch plate and said hub portion, means for rotating said shaft, a plurality of recorder modules mounted between said end units, a plurality of hollow cylindrical drum segments interconnected with each other and forming a composite drum assembly mounted between said end units, one end of said drum assembly being connected to said first disc and the other end of said drum assembly being connected to said second disc, a recording means mounted adjacent said drum assembly and having a recording element thereon adapted to bear against said drum assembly, means engaging said recording means for deflecting said recording element in accordance with the changing conditions of a measured variable, and means associated with each module and with each end unit for connecting all of said modules together in assembled relation and to the end units.

12. A recorder as set forth in claim 11 wherein biasing means is provided in said one end unit for urging said first disc resiliently in a direction towards said second disc to insure proper engagement of said drum assembly between said discs.

References Cited by the Examiner

UNITED STATES PATENTS

| | | | |
|---|---|---|---|
| 1,095,022 | 4/14 | O'Brien | 346—7 |
| 1,114,348 | 10/14 | Flynn | 70—433 |

LEYLAND M. MARTIN, *Primary Examiner.*